United States Patent [19]
Nakagawa
[11] Patent Number: 4,808,801
[45] Date of Patent: Feb. 28, 1989

[54] BANK NOTE CARTRIDGE IDENTIFICATION SYSTEM FOR CASH DISPENSER

[75] Inventor: Masakatu Nakagawa, Kusatsu, Japan
[73] Assignee: Omron Tateisi Electronics Co., Kyoto, Japan

[21] Appl. No.: 743,151
[22] Filed: Jun. 10, 1985
[30] Foreign Application Priority Data
Jun. 11, 1984 [JP] Japan ................................ 59-120929
[51] Int. Cl.[4] .......................... G06F 15/30; G06F 7/04
[52] U.S. Cl. .................................... 235/379; 235/375; 235/381; 902/13
[58] Field of Search ............... 235/379, 380, 376, 381, 235/375, 462, 449, 385; 340/825.31; 221/12, 191; 414/32; 271/9; 209/534; 902/9, 11, 13, 14

[56] References Cited

U.S. PATENT DOCUMENTS

| | | | |
|---|---|---|---|
| 3,833,885 | 9/1974 | Gentile . | |
| 4,283,097 | 8/1981 | Lundblad | 340/825.31 |
| 4,337,393 | 6/1982 | Hilton | 235/385 |
| 4,375,032 | 2/1983 | Uchida | 235/380 |
| 4,380,316 | 4/1983 | Glinka . | |
| 4,437,660 | 3/1984 | Tompkins et al. | 209/534 |
| 4,500,080 | 2/1985 | Aigo | 235/380 |
| 4,546,240 | 10/1985 | Imamichi | 235/379 |
| 4,577,763 | 3/1986 | Placke et al. | 235/381 |
| 4,650,977 | 3/1987 | Couch | 235/381 |
| 4,670,643 | 6/1987 | Hain et al. | 235/375 |

FOREIGN PATENT DOCUMENTS

| | | |
|---|---|---|
| 0004436 | 10/1979 | European Pat. Off. . |
| 0030413 | 6/1981 | European Pat. Off. . |
| 2443405 | 7/1980 | France . |

*Primary Examiner*—Alan Faber
*Assistant Examiner*—Robert A. Weinhardt
*Attorney, Agent, or Firm*—Stevens, Davis, Miller & Mosher

[57] ABSTRACT

This bank note cartridge identification system is for a bank note dispensing machine and a bank note cartridge which can be fitted to the bank note dispensing machine. It includes: a code setting unit, incorporated in the bank note cartridge, for setting an identification code; a signal generating unit, incorporated in the bank note cartridge, for generating a signal representative of the identification code set by the setting unit and for transmitting it to the bank note dispensing machine, when the bank note cartridge is fitted to the bank note dispensing machine; and a signal checking unit, incorporated in the bank note dispensing machine, for checking the signal, outputted by the signal generating unit, representative of the identification code set by the setting unit. Thereby, the checking unit can verify that the particular bank note cartridge fitted to the bank note dispensing machine is the correct and proper one, thus improving safety and security and keeping good track of various bank note cartridges.

3 Claims, 3 Drawing Sheets

BANK NOTE CARTRIDGE IDENTIFICATION SYSTEM FOR CASH DISPENSER

BACKGROUND OF THE INVENTION

The present invention relates to a bank note cartridge identification system for a bank note dispensing machine such as an automatic teller machine and a bank note cartridge or cartridges which are to be fitted thereto, and in particular relates to such a bank note cartridge identification system which can keep good track of various bank note cartridges and can check that the correct cartridge or cartridges is fitted to such a bank note dispensing machine, at all times.

Conventionally, bank note dispensing machines such as automatic teller machines and the like are replenished with bank notes by being charged with cartridges which are themselves beforehand loaded with bank notes at an operations center or some such place where security is excellent. And typically in fact such a bank note dispensing machine is charged with a different cartridge for each denomination of notes which it dispenses. However, since a conventional such cartridge for bank notes does not show on its outside the various details relating to it, such as how many bank notes it is currently charged with, their denomination, and for what automatic bank note dispensing machine (out of a plurality of automatic bank note dispensing machines typically handled by the operations center) said bank note cartridge is destined, the problem arises that, when various bank note cartridges are being distributed from such an operations center for being charged to various different automatic bank note dispensing machines, it is difficult to identify which cartridge to charge to which bank note dispensing machine, and mistakes are liable to occur with the charging process. Such mistakes can lead to serious lapses of security, and provide a fertile ground for fraud, waste, and abuse. Further, if a cartridge should happen to be lost in transit, as after being removed from a bank note dispensing machine, it cannot be readily determined which cartridge has been lost.

SUMMARY OF THE INVENTION

Accordingly, it is the primary object of the present invention to provide a bank note cartridge identification system which can overcome the above identified problems.

It is a further object of the present invention to provide such a bank note cartridge identification system which can reliably match bank note cartridges with the appropriate bank note dispensing machine for which they are destined.

It is a further object of the present invention to provide such a bank note cartridge identification system which ensures that if a bank note cartridge is lost after being removed from a bank note dispensing machine it is possible easily to determine which such bank note cartridge has been lost.

It is a yet further object of the present invention to provide such a bank note cartridge identification system which can help to prevent waste.

It is a yet further object of the present invention to provide such a bank note cartridge identification system which improves protection against fraud.

It is a yet further object of the present invention to provide such a bank note cartridge identification system which provides good security.

According to the most general aspect of the present invention, these and other objects are accomplishd by a bank note cartridge identification system, for a bank note dispensing machine and a bank note cartridge which can be fitted to said bank note dispensing machine, comprising: (a) a means, incorporated in said bank note cartridge, for setting an identification code; (b) a means, incorporated in said bank note cartridge, for generating a signal representative of said identification code set by said setting means and for transmitting it to said bank note dispensing machine, when said bank note cartridge is fitted to said bank note dispensing machine; and (c) a means, incorporated in said bank note dispensing machine, for checking said signal, outputted by said generating means, representative of said identification code set by said setting means.

According to such a structure, it is possible to set on each bank note cartridge which is to be used in this system, by the use of its above defined code setting means, a unique code, and this code can include information such as an attendance code, a cartridge serial number, and so on. And when a bank note cartridge is charged to the bank note dispensing machine, then the generating means generates a signal representative of this code and sends it to the bank note dispensing machine. And in the bank note dispensing machine the checking means then checks this signal and verifies that the code set to this bank note cartridge is correct, i.e. that the correct and appropriate bank note cartridge has been charged to the bank note dispensing machine. As a result, a considerable improvement can be made in terms of handling and security by allowing reliable identification of the charged cartridge from the side of the bank note dispenser and by aiding with the instantaneous determination of any lost cartridge which may have been lost in transit. Thus, fraud, waste, and abuse are made very difficult.

Further, according to a more particular aspect of the present invention, these and other objects are more particularly and concretely accomplished by such a bank note cartridge identificatin system as described above, wherein said checking means comprises a means for communicating with a distant center for verifying the validity of said identification code set to said bank note cartridge by said setting means.

According to such a structure, this distant operations center can keep track of the proper bank note cartridges to be fitted to a plurality of bank note dispensing machines, and can receive and provide the information necessary for up to the minute checking of each bank note cartridge charged to each of these bank note dispensing machines. Thus, mistakes in the charging of the bank note dispensing machines are kept to a minimum.

BRIEF DESCRIPTION OF THE DRAWINGS

The present invention will now be shown and described with reference to the preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and spaces and so on are denoted by like reference symbols in the various figures thereof, and:

DESCRIPTION OF THE PREFERRED EMBODIMENT

Figure 1:
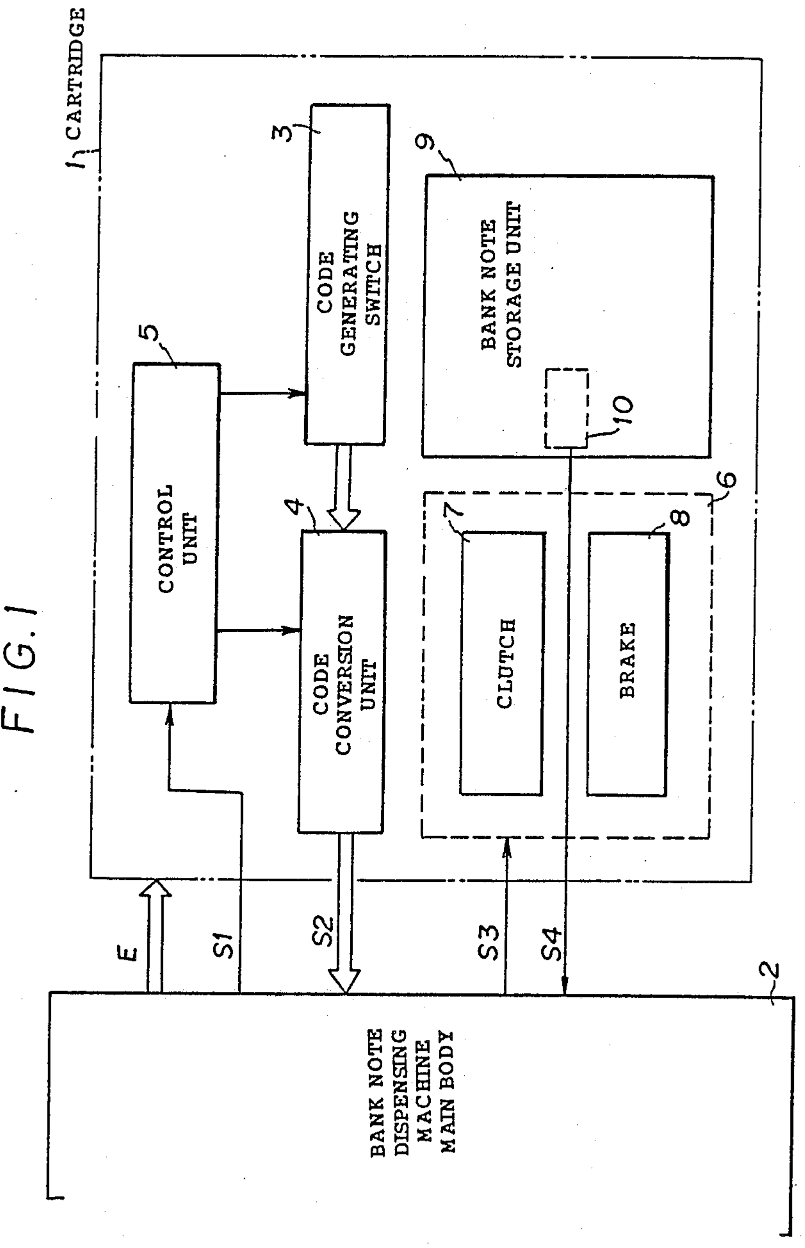
FIG. 1 is a schematic block diagram showing the main body of a bank note dispensing machine and in block diagrammatical form the internal structure of a bank note cartridge therefor, these together incorporating said preferred embodiment of the bank note cartridge identification system according to the present invention.

The present invention will now be described with reference to the preferred embodiment thereof, and with reference to the appended drawings. FIG. 1 is a schematic block diagram showing a bank note cartridge 1 and the main body 2 of a bank note dispensing machine, together incorporating said preferred embodiment of the bank note cartridge identification system according to the present invention; and in this figure the internal structure of the bank note cartridge 1 is schematically shown in a block diagrammatical form. The activation of this bank note cartridge 1 is commenced when it is physically inserted into the main body 2 of the bank note dispensing machine and receives a supply of electrical energy therefrom as shown by "E" in FIG. 1; and the bank note cartridge 1 comprises a code generating switch 3, a code conversion unit 4, and a control unit 5. The code generating switch 3 is for setting up an attendance code; the code conversion unit 4 is for converting the code set up on the code generating switch 3 into a code signal S2 and sending this code signal S2 to the main body 2 of the bank note dispensing machine; and the control unit 5 is for controlling the code generating switch 3 and the code conversion unit 4. Further, the control unit 5 is operated by receiving a control signal S1 from the main body 2 of the bank note dispensing machine, when as explained above the bank note cartridge 1 is physically inserted into said main body 2 of the bank note dispensing machine.

Moreover, within the bank note cartridge 1 there is provided a bank note storage unit 9 in which bank notes are put and stored, and the take out side of this bank note storage unit 9 is provided with a note take out sensor 10 which detects when a bank note or notes is or are taken out of the bank note storage unit 9 and produces an output signal S4 indicative thereof which is sent to the main body 2 of the bank note dispensing machine. And the bank note cartridge 1 further comprises a take out unit 6 for taking out bank notes from this bank note storage unit 9, which comprises a clutch 7 for a take out roller not shown in the drawings, and a brake 8. The clutch 7 and the clutch brake 8 are turned ON and OFF according to a control signal S3 which is dispatched from the main body 2 of the bank note dispensing machine.

Figure 2:
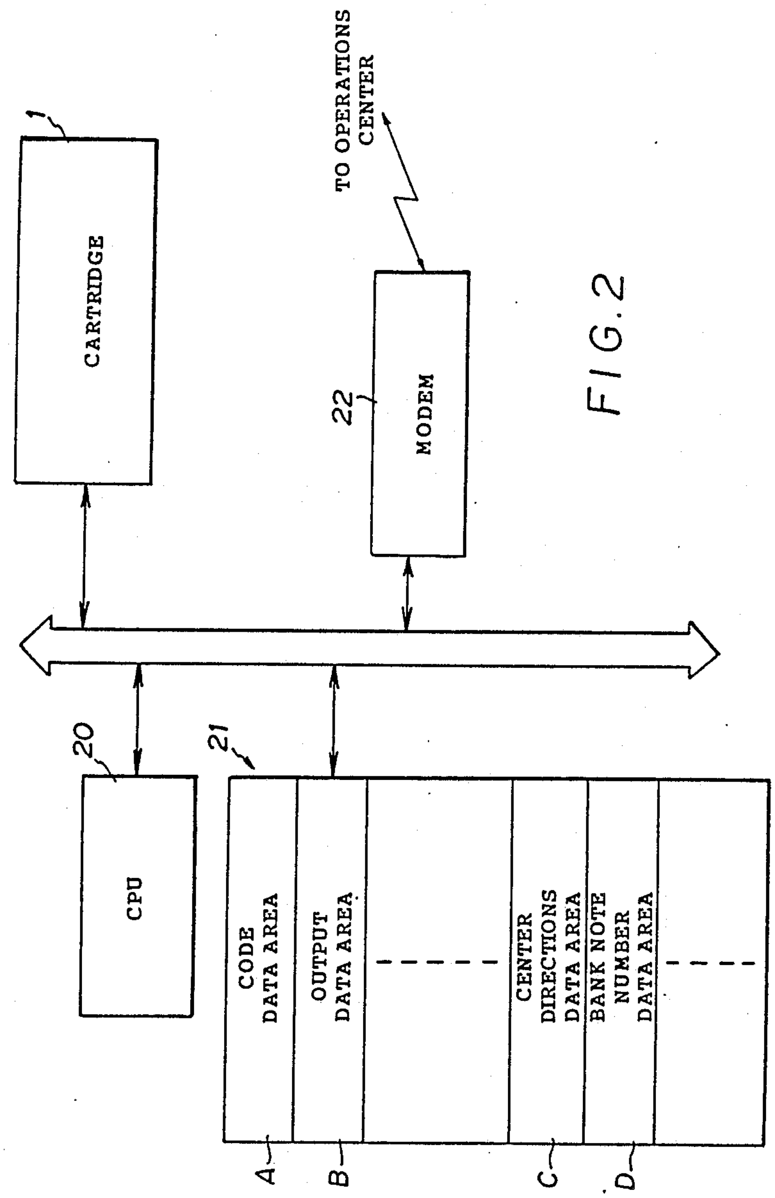
FIG. 2 is a schematic block diagram showing part of the internal structure of a control system for the bank note dispensing machine, and also showing the cartridge.

FIG. 2 shows in schematic form the internal structure of the main body 2 of the bank note dispensing machine. A control unit thereof comprises a microcomputer system comprising a CPU 20 and a memory means 21, which are interconnected via a common bus. And via this common bus the CPU 20 and the memory means 1 are interconnected with the cartridge 1 for the bank note dispenser, for the transmission of the signals S1, S2, S3, and S4 of FIG. 1 therebetween, said bank note cartridge 1 being connected to said bus when said bank note cartridge 1 is fitted into the bank note dispenser. Further, a modem 22 is connected to the common bus, and its other side is connected via a transmission line with an operations center (not illustrated in the figures) which controls the operation of this bank note dispensing machine among others.

In the memory 21 there are areas A, B, C, and D. The area A is used as a code data area for storing attendance code data as dispatched from the code conversion unit 4; the area B is used as an output data area for data from the note take out sensor 10; the area C is used as a operations center directions data area for storing data representing instructions from the operations center as dispatched from said operations center via the modem 22; and the area D is used as a banknote number data area for storing data representing the number of banknotes to be dispensed to the current user of the bank note dispenser machine, as dispatched from the operations center via the modem 22.

Although it is not so shown in the drawings, the operations center maintains a file of data for managing the numbers and denominations of bank notes in each of the cartridges in each of the bank note dispenser machines which are managed by the center. Also, the main body 2 of the bank note dispensing machine is provided with a CRT display for displaying operating instructions and results, facing towards the customer of the bank note dispensing machine, but this is not particularly shown in the figures.

Next, the operation of the preferred embodiment of the bank note cartridge identification system according to the present invention, and the operation of this bank note dispensing machine when it is loaded with the cartridge 1, will be explained, with reference to the flow chart shown in FIG. 3 of the operation of the microcomputer shown in FIG. 2.

Initially, when the cartridge 1 is separate from the main body 2 of the bank note dispensing machine, typically at the time that it is being charged with a new supply of bank notes which may be performed at the operations center, an attendant sets up a particular attendance code for the cartridge 1 by setting it using the code generating switch 3. This particular attendance code may have any of a variety of particular significances, but typically will specify a particular episode of charging of the cartridge 1, and this episode will be associated in the abovementioned file kept by the operations center with a particular target bank note dispensing machine for fitting of this cartridge 1, with a particular denomination of bank note and number of such bank notes charged into the cartridge 1, and so on. Thus, when provided with the particular attendance code set up for the cartridge 1, the operations center will be apprised of all necessary data about the cartridge 1.

Next, the cartridge 1 typically is removed from the operations center and is conveyed under guard to the vicinity of the particular bank note dispensing machine for which it is destined; and said cartridge 1 is then physically inserted into the main body 2 of said appropriate bank note dispensing machine and receives a supply of electrical energy therefrom as shown by "E"

in FIG. 1. At this time, the operation of the program illustrated in FIG. 3 is started, in the START block.

Figure 3:
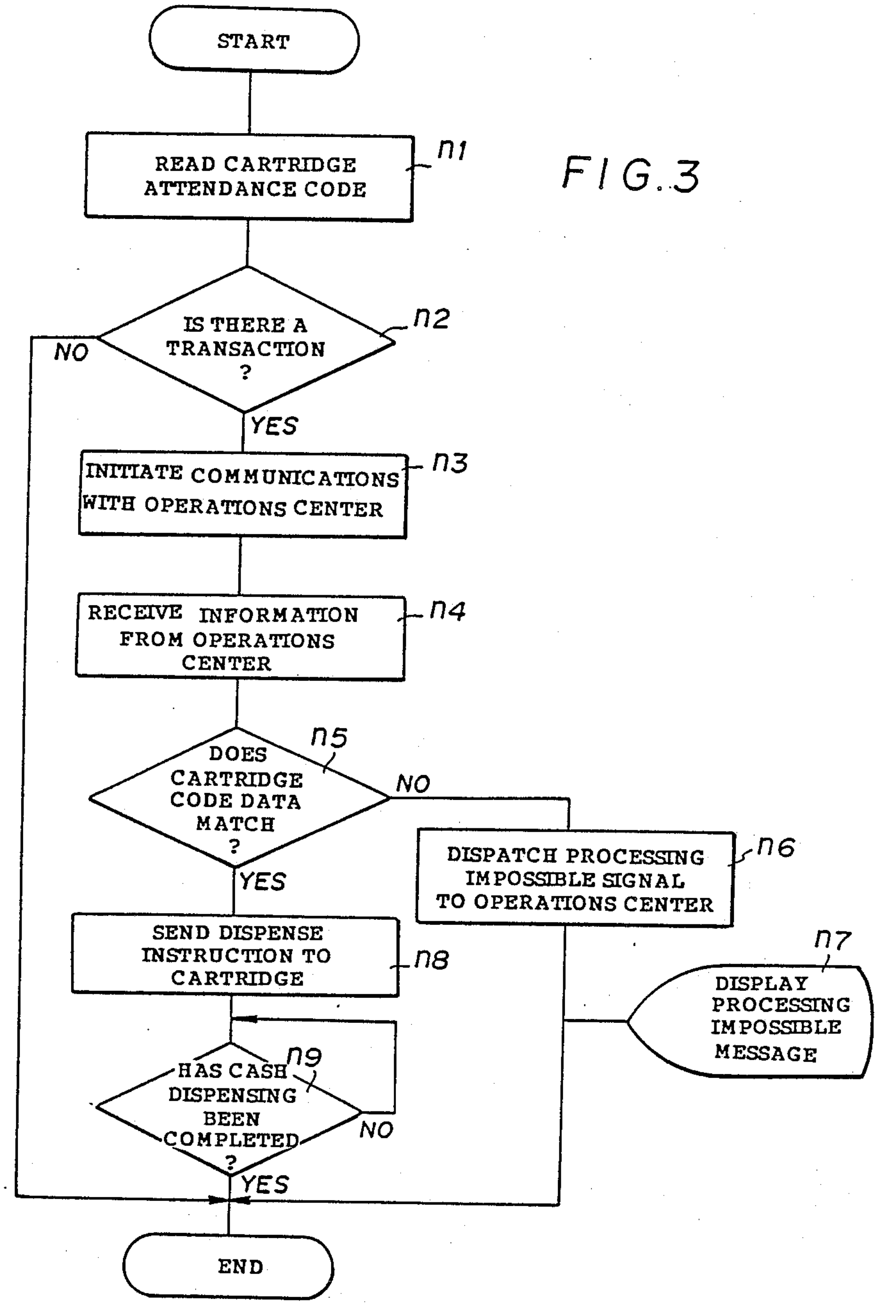
FIG. 3 is a flow chart illustrating the operation of a program stored in a microcomputer incorporated in the control system illustrated in FIG. 2, for explaining the operation of the bank note cartridge identification system according to the present invention.

The first thing that now happens is that the CPU 20 outputs a command signal S1 to the control unit 5 which causes it to so control the code generating switch 3 and the code conversion unit 4 that the aforesaid attendance data set up by the code generating switch 3 are processed by the code conversion unit 4 and are converted to a code signal S2 which is dispatched from the cartridge 1 to the main body 2 of the bank note dispensing machine, and the data in this code signal S2 is received by the CPU 20 and is stored in the area A of the memory means 21; this step is denoted by the step n1 of the FIG. 3 flow chart.

Next, in the step n2, a test is made as to whether or not a transaction is present; if not, the program terminates, but if a transaction is ready to be processed then the designation of the dispensing transaction for the customer and the inputting of the sum of money to be dispensed in the form of bank notes are performed, and thus the transaction process is executed.

Next, in the step n3, communications are initiated with the operations center and the above information is dispatched thereto; and next in the step n4 information is received from the operations center: a cartridge code for the denominations corresponding to the sum to be dispensed to the customer of the bank note dispensing machine, and data relating to the number of bank notes to be so dispensed for each of the cartridges. The cartridge code data designated by the operations center is stored in the area C of the memory means 21, while the number of bank notes to be dispensed designated by the operations center is stored in the area D of the memory means 21.

Next, in the step n5, matching is made by the CPU 20 of the cartridge code data. In other words, by determination of matching or not matching of the code data in the area A of the memory means 21 with the code data in the area C thereof, it is determined whether or not the cartridge designated by the center is loaded into the bank note dispenser machine.

If the cartridge which is loaded is not the one designated by the center, or the cartridge designated by the center is not loaded, i.e. if the result of the test in the decision block n5 is NO, then it is determined that it is impossible to continue with the processing of the dispensation of bank notes to the customer, and the flow of control passes to the step n6, in which a signal is dispatched to the operation center informing said operation center of this situation, and next the flow of control passes to the step n7, in which a "processing impossible" message is displayed on the CRT display (not shown) in order to inform the customer that dispensation of bank notes is impossible; and then the operation of the FIG. 3 program is terminated.

On the other hand, if the cartridge which is loaded is the one designated by the center, i.e. the cartridge designated by the center is loaded, i.e. if the result of the test in the decision block n5 is YES, then it is determined that it is in fact possible to continue with the processing of the dispensation of bank notes to the customer, and the flow of control passes to the step n8, in which appropriate signals S3 are dispatched to the clutch 7 and to the brake 8 of the take out unit 6 of the cartridge 1 for taking out the appropriate number of bank notes from the bank note storage unit 9; this appropriate number is the number of bank notes recorded in the area D of the memory means 21 of the bank note dispensing machine control system. Next, the flow of control passes to the step n9, in which a test is made as to whether the bank note dispensing operation by said take out unit 6 has been completed or not, which is ascertained according to the signals S4 received from the note take out sensor 10 provided to the bank note storage unit 9, which indicate the actual taking out of each bank note in an ongoing manner. Track of these output signals is kept by using the area B of the memory means 21 of the bank note dispensing machine control system. In this step n9, until the count of the dispensed bank notes is completed, the program loops back; and on the other hand, when said count of the dispensed bank notes is completed, so that the appropriate number of banknotes has definitely been dispensed to the customer, the flow of control passes to the END block of the FIG. 3 program.

By this operation, therefore, dispensation of the appropriate number of bank notes corresponding to the sum to be dispensed to the customer of the bank note dispensing machine is performed from the cartridge 1, for which the attendance code is set up on the code generation switch 3. In other words, because the attendance code can be arbitrarily and appropriately set up for the cartridge 1, and because the checking of the code on the cartridge 1 is performed as explained above when the cartridge 1 is loaded into the main body 2 of the bank note dispensing machine, it becomes possible for the operations center to manage the bank note cartridges for each of the codes, for a plurality of various bank note dispensing machines if need be, and the management of these bank note dispensing machines is made smoother with additional advantages relating to the improvement of security.

Thus it is seen that according to the shown structure it is possible to set on each bank note cartridge which is to be used in this system, by the use of its code setting means, a unique code, and this code can include information such as an attendance code, a cartridge serial number, and so on. And when a bank note cartridge is charged to the bank note dispensing machine, then the generating means generates a signal representative of this code and sends it to the bank note dispensing machine. And in the bank note dispensing machine the checking means then checks this signal and verifies that the code set to this bank note cartridge is correct, i.e. that the correct and appropriate bank note cartridge has been charged to the bank note dispensing machine. As a result, a considerable improvement can be made in terms of handling and security by allowing reliable identification of the charged cartridge from the side of the bank note dispenser and by aiding with the instantaneous determination of any lost cartridge which may have been lost in transit. Thus, fraud, waste, and abuse are made very difficult.

Although the present invention has been shown and described with reference to the preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, although in the above described preferred embodiment the code set for the cartridge was an attendance code, in other possible embodiments the code could be of some other sort, as long as it is an indication code which is required by the operations center for managing the cartridge: this code could be a cartridge serial number, for instance. Other modifications are also possible. Therefore it is desired that the scope of the present invention, and of the protection sought to be granted by Letters Patent, should be defined not by any of the perhaps purely fortuitous details of the shown preferred embodiment, or of the drawings, but solely by the scope of the appended claims, which follow.

What is claimed is:

1. A bank note cartridge identification system, for at least one bank note dispensing machine and a plurality of bank note cartridges which can be fitted to said dispensing machine, said system comprising:

(a) a code setting means comprising an attendant-operable code generating switch, incorporated in each one of said cartridges, for setting an identification code by an attendant, said identification code comprising data indicating a denomination of bank notes loaded in said cartridges;

(b) a signal generating means, incorporated in each one of said cartridges, for generating a signal representative of said identification code set by said setting means and for transmitting it to said dispensing machine, when one of said cartridges is fitted to said dispensing machine; and (c) a checking means, incorporated in said dispensing machine, for checking said signal, outputted by said generating means, representative of said identification code set by said setting means, by comparing said signal with a signal supplied to said checking means by an operations center, said operations center further supplying information to said dispensing machine with respect to (i) identification codes of particular ones of said cartridges which are fitted therein and which contain bank note denominations to be dispensed and (ii) a number of bank notes to be dispensed from each of said particular cartridges in order to control the sum of money to be dispensed to a customer.

2. A bank note cartridge identification system according to claim 1, wherein said checking means comprises a means for communicating with said operations center for verifying the validity of said identification code set to said cartridges by said setting means.

3. A bank note cartridge identification system according to claim 1, each one of said cartridges comprising a dispensing means for dispensing bank notes from said bank note cartridge to said bank note dispensing machine, further comprising a signal dispatching means incorporated in each one of said cartridges for dispatching a signal to said dispensing machine when bank notes are dispensed by said dispensing means, and a control signal dispatching means incorporated in said dispensing machine for dispatching control signals to said dispensing means.

* * * * *